United States Patent [19]
Tsen et al.

[11] 3,883,669
[45] *May 13, 1975

[54] METHOD OF INCREASING THE PROTEIN CONTENT OF WHEAT FLOUR BASED, LOW SHORTENING, LOW SUGAR BAKED AND FRIED PRODUCTS

[75] Inventors: Cho C. Tsen; William J. Hoover, both of Manhattan, Kans.

[73] Assignee: Kansas State University Research Foundation, Manhattan, Kans.

[ * ] Notice: The portion of the term of this patent subsequent to Dec. 18, 1990, has been disclaimed.

[22] Filed: Nov. 12, 1973

[21] Appl. No.: 415,012

Related U.S. Application Data

[63] Continuation-in-part of Ser. No. 78,239, Oct. 5, 1970, Pat. No. 3,780,188.

[52] U.S. Cl. .................... 426/549; 426/21; 426/24; 426/25; 426/557; 426/653

[51] Int. Cl.......... A21d 2/14; A21d 2/26; A23l 1/16

[58] Field of Search ........... 426/152, 185, 204, 205, 426/208, 212, 343, 347, 21, 24, 25, 158

[56] References Cited

OTHER PUBLICATIONS

Tenney et al., "Sodium Stearoyl-2 Lactylate, " The Oakers Digest, Vol. 42, Dec. 1968, pp. 38–42.

*Primary Examiner*—James R. Hoffman
*Attorney, Agent, or Firm*—Schmidt, Johnson, Hovey & Williams

[57] ABSTRACT

A protein fortified composition and premix for preparing wheat flour based, low shortening and low sugar, baked and fried goods, and a method of incorporating protein supplements into the ingredients of such products without adversely affecting the volume, texture, shelf life, crumb grain or organoleptic properties of the finished goods. The method comprises adding to the original ingredients of a selected product from 0.1 to 3 percent by weight, based upon the total weight of the wheat flour content, of an additive selected from the group consisting of the edible alkali and alkaline earth metal salts of the acyl lactylates of $C_{16}$–$C_{18}$ fatty acids, with the average number of lactylic groups in the additive ranging from about 0.5 to 4. In preferred forms, the additive is a member of the group consisting of the sodium and calcium salts of the acyl lactylates of $C_{16}$–$C_{18}$ fatty acids, and the protein supplement is defatted soy flour. The defined additives permit incorporation of significant amounts of soy flour in various products as a protein supplement therefor, and undesirable taste properties associated with the latter are effectively masked in low sugar, low shortening baked or fried products such as breads or oriental noodles.

13 Claims, No Drawings

METHOD OF INCREASING THE PROTEIN CONTENT OF WHEAT FLOUR BASED, LOW SHORTENING, LOW SUGAR BAKED AND FRIED PRODUCTS

This application is a continuation-in-part of application Ser. No. 78,239, filed Oct. 5, 1970, now U.S. Pat. No. 3,780,188, and entitled METHOD OF INCREASING PROTEIN CONTENT OF WHEAT FLOUR BASED BAKED AND FRIED PRODUCTS AND COMPOSITIONS FOR PREPARING SAME. The subject matter of the parent application is expressly incorporated herein by reference.

This invention relates to novel high-protein, wheat flour based compositions for preparing low shortening and low sugar, baked and fried goods such as breads or the like and a method of production of such protein fortified end products. More particularly, it is concerned with a method and composition (or premixes therefor) wherein a protein supplement such as soy flour may be readily incorporated with the wheat flour without deleteriously affecting the quality and organoleptic properties of the finished food product prepared therefrom by virtue of the employment of an additive selected from the group consisting of the edible alkali and alkaline earth metal salts of the acyl lactylates of $C_{16}$–$C_{18}$ fatty acids, with the average number of lactylic groups in the additive ranging from about 0.5 to 4.

Wheat based baked or fried goods are staple foods in many countries of the world because of their relatively high caloric value, ready availability of wheat flour at an economical price, and the attractive organoleptic and appearance properties of the resultant food products. However, it is desirable to increase the nutritional content of the bread, and other wheat based foods, particularly from a protein standpoint. It has long been recognized in this respect that breads and other baked or fried goods could be improved in major respects by incorporation of a protein supplement therein in lieu of a part of the wheat flour normally in the bread dough, or as an additive thereto. Soy flour for example is an especially attractive protein supplement for flour based baked products such as bread, biscuits or other fried goods because of the high content of good nutritional quality protein therein and the fact that such flour is readily available in most areas of the world.

Although enrichment programs providing for the addition of vitamins and minerals to baked goods have been successfully used for many years, provision of additional protein at a low cost has thus far evaded really successful implementation. This stems primarily from the fact that increases in the protein content of wheat flour based breads and other baked or fried products to a level which significantly improves nutrition almost invariably has an adverse effect on the quality of the food product attributable to the supplement added, not only from the organoleptic standpoint but also from the appearance, physical quality and shelf life of the resultant products.

The most consistent objection to protein supplementation of baked and fried products such as bread stems from the fact that low cost, readily available protein additives impart an undesirable taste to the food product, or otherwise detract from the appearance or organoleptic properties of the food items. However, in the case of high shortening, high sugar products such as sweet goods and sweet rolls, these problems are mitigated by virtue of the inherent nature of the dough formulations employed. Specifically, because of the high shortening and sugar content of such doughs, the undesirable flavor of, for example soy four, is to a large degree masked and not apparent to the consumer.

In contrast though, when it is attempted to fortify low shortening, low sugar baked goods in the nature of conventional breads or fried goods such as oriental noodles through the addition of soy flour or other protein supplements thereto, the ingredients thereof have very little inherent taste masking properties. The lack of significant quantities of sugar and shortening is believed to be chiefly responsible for the comparative inability of such doughs to hide the characteristic taste associated with soy or other similar protein supplements. Hence, little success has heretofore been achieved with attempts to employ protein supplements, and particularly soy four, in conventional breads or the like which are classified as wheat flour based, low shortening, low sugar products.

Soy flour is a particularly valuable additive for breads and the like not only because of its high protein content but also by virtue of the fact that it contains 3.2 to 3.8 percent lysine as compared with 0.375 percent in wheat flour. Thus, with the addition of 12 grams of soy flour to 100 grams of wheat flour the lysine content will be more than doubled to a value of from 0.76 to 0.83 percent. The resulting product thus provides an exceptional vehicle for nutritional improvement of the human diet.

It has now been discovered that the nutritive quality of breads and other low shortening, low sugar baked and fried products can be measurably improved by incorporation of a protein supplement such as soy flour in conjunction with from 0.1 to 3 percent baker's weight (preferably about 0.5 percent) of an additive selected from the group consisting of the edible alkali and alkaline earth metal salts of the acyl lactylates of $C_{16}$–$c_{18}$ fatty acids containing an average number of lactylic groups therein ranging from about 0.5 to 4. It is significant in this regard that protein content is improved without a corresponding loss in loaf volume, organoleptic characteristics and other desirable physical properties.

Incorporation of an additive of the class described, and preferably sodium stearoyl-2-lactylate or to a lesser degree calcium stearoyl-2-lactylate, permits supplementation of the wheat flour based doughs or the like with any one or more of a number of protein additives. These may for example be selected from the group consisting of soy flour, soy isolates, nonfat milk solids, whey products, fish protein concentrates, cottonseed flour, chickpea flour, sesame seed flour, corn-soy-milk blend flour, wheat protein concentrate, wheat gluten, defatted wheat germ, Torula yeast, wheat soy blend flour, edible single cell proteins, and mixtures thereof. Generally speaking, the wheat based, low shortening, low sugar compositions referred to herein contain from about 0 to 8 percent (baker's weight) of sugar and from about 0 to 6 percent (baker's weight) of shortening.

It is therefore the most important object of this invention to provide a protein fortified composition and premix for preparing wheat flour based, low shortening, low sugar baked and fried goods of pleasing appearance and taste, in conjunction with a method of supplementing the protein content of such products to improve the nutritional qualities thereof.

A further important object of the invention is to provide a wheat flour based, low shortening, low sugar bread or other baked or fried composition wherein a protein supplement may be added thereto without significantly altering the processing conditions required for preparation of the food product therefrom, in the baking or frying conditions themselves, or in the equipment required for mixing and processing of the dough formulations. In this respect, the invention lends itself to permitting incorporation of significant amounts of non-wheat or wheat protein supplements in bread doughs or other baked or fried products at significant nutritive levels without substantially increasing the costs of the food item by virtue of the fact that the active ingredient permitting incorporation of the protein additive is not only available at a practical commercial cost, but is also effective at a relatively low concentration.

Another significant object of the invention is to provide an improved method of increasing the nutritive value of wheat flour based, low shortening, low sugar baked or fried goods wherein the protein supplement and the additive permitting incorporation thereof into the wheat flour may be packaged as a separate item for incorporation into bread or fried good dough ingredients at the time of mixing thereof, thus permitting supplementation of the dough with high nutritive constituents without altering the dough preparation procedure or making it necessary to install additional treating, handling, or mixing equipment.

In this connection, it is an object of the invention to provide a novel method for incorporating protein supplements into low shortening, low sugar bread doughs which is equally applicable to straight dough, short-time dough, notime dough, sponge dough or continuous dough bread making processes without alteration of the present sequence of steps involved therein.

In accordance with the preferred concepts of the present invention, it has been found that incorporation of from 0.1 to 3 percent (preferably 0.5 percent) baker's weight of an additive selected from the group consisting of the sodium and calcium salts of the acyl lactylates of $C_{16}$–$C_{18}$ fatty acids, with the average number of lactylic groups present therein being from about 0.5 to 4 permits addition of a non-wheat or wheat protein supplement to a wheat flour based, low shortening, low sugar bread or baked or fried dough product. In this regard, sodium and calcium stearoyl-2-lactylates are especially preferred additives for incorporation into doughs containing from about 0 to 8 percent by weight sugar and from about 0 to 6 percent by weight shortening, in conjunction with soy flour as a protein supplement. Additionally, the preferred protein supplement, soy flour, can be added in an amount which significantly enhances the nutritional quality of the resultant product, but the latter nevertheless retains excellent taste, organoleptic properties and other desirable qualitites associated with unfortified food products of the same type.

For example, 12 parts by weight of soy flour may be added to a conventional bread dough composition for each 100 parts of standard wheat flour contained therein, with the preferred additives being present at a level of about 0.5 percent baker's weight (i.e., 0.5 part by weight for each 100 parts by weight of wheat flour in the dough). Best results are obtained when sodium stearoyl-2-lactylate is employed, although calcium stearoyl-2-lactylate is equally usuable. In certain instances, a somewhat larger relative amount of the latter compound is utilized as compared with the optimum quantity of sodium stearoyl-2-lactylate in order to obtain an equivalent quality in the final baked or fried product.

Typically, bread or other doughs of the low shortening low sugar variety are made up of wheat flour, salt, yeast, sugar, shortening and water. In addition, an oxidizer such as potassium bromate is usually employed to insure improvement in the volume and quality of finished products. The present invention contemplates incorporation of a protein supplement into such doughs as an additive thereto, although in certain circumstances it may be desirable to substitute a quantity of protein supplement for a part or all of the wheat flour normally incorporated into the bread or fried goods' recipe, depending principally upon the nature of the protein additive.

It is a common practice in the baking industry to regard "specific loaf volume" as an important parameter for gauging the marketability of bread. A marketable bread should have a specific volume of over 6.00 cc/g. provided it also has acceptable appearance, crumb texture, grain and organoleptic properties. Although incorporation of 12 percent soy flour (baker's weight) into bread dough is adequate for most commercial purposes, it has been found that the level of soy flour can be increased to 16 percent if desired using only 0.5 percent sodium stearoyl-2-lactylate as an additive for use therewith, and levels as high as 20 percent full fat soy flour can readily be adopted without sacrificing the necessary specific loaf volume. In the latter case it may be desirable to slightly increase the amount of lactylate employed to insure retention of the necessary physical and taste properties in the bread. In general though, breads produced in accordance with this invention all maintain the requisite loaf volume and other indicia of baked quality.

An almost limitless number of blends or premixes combining wheat flour and protein supplements may be used in accordance with the concepts of this invention, particularly from the standpoint of the quantity of supplement added or substituted for wheat flour. Likewise, a large variety of protein premixes containing a protein supplement in conjunction with the defined additives can be prepared for incorporation into wheat flour just prior to preparation of dough for the production of low shortening, low sugar breads or baked or fried end products.

For most purposes though, it is preferred that the amount of protein rich additive added to the bread composition be at a level to provide an additional amount of protein in the finished product in the range of at least about 4 to 8 percent by weight. However, addition of certain protein rich additives to provide for protein additions outside the above range may be desirable in certain instances. In general, incorporation of the preferred sodium or calcium stearoyl-2-lactylate into the bread, or baked or fried product dough provides improvements therein over a much wider range of protein supplementation than has heretofore been possible.

The lower limit of protein supplementation which does not require addition of the sodium or calcium salts as defined above is that amount which does not adversely affect the finished product in the absence of the lactylate additive. Although the protein supplementation which may be carried out without addition of sodium or calcium stearoyl lactylates varies in accordance with the supplement incorporated into the mixture, the upper limit of protein supplementation without inclusion of an additive in accordance with the present invention is usually about 2 percent by weight of protein added to the dough. The upper limit of protein supplementation along with addition of the acyl lactylates is usually dictated primarily by economic considerations. Normally, it is not essential to go above about 12 percent by weight of protein rich food stuff added to the final bread, baked or fried dough products. Thus, when protein supplementation is at a level of about 2¼ percent or more (total protein added to the finished product) an additive as set forth herein should be employed at a concentration within the range of 0.1 to 3 percent, or preferably about 0.5 percent (baker's weight). The following examples will serve to demonstrate the invention disclosed herein. It is to be understood that these examples are merely illustrative in nature and are not to be taken as limitations on the overall scope of the invention.

EXAMPLE I

The effect of SSL on bread quality of breads containing either defatted soy flour or full fat soy flour using a no-time straight dough process is illustrated in this example.

The bread formula, on a flour basis, calls for 100 percent flour (14 percent moisture basis), 12 percent (variable) of soy flour or other protein-rich foodstuffs, 3 percent yeast, 5 percent sugar, 2 percent salt, variable water, variable bromate, and 0.5 percent sodium stearoyl-2-lactylate.

All the ingredients are combined at room temperature in a vertical mixer, equipped with a MacDuffee type bowl and fork, and mixed at first speed (low) for one minute and then at second speed (medium) to optimum dough development. The dough is then scaled into 500-g pieces, rounded, and let rest for 40 minutes at 86°F and 85 percent relative humidity. The doughs are then moulded, panned, and proofed at 96°F and 92 percent relative humidity to height (1.5 cm) over the pan. Baking is at 425°F for 25 minutes. Loaf weight and volume were measured within 10 minutes after bread was removed from the oven and averaged from duplicates. Specific loaf volume (cc. per g.) was then calculated from the average loaf weight and volume. Specific loaf volume is an important parameter of bread's marketability. Generally, specific volume of marketable bread (1-lb. loaf) should be at least 6.00 (2,722 cc.) with acceptable appearance, crumb texture, and grain. Breads were scored 18 hours after baking. Finished bread that scored below 5 was regarded as unsatisfactory. Most of the baking tests were repeated at least once on a different day to substantiate results. The results are given in Table I.

TABLE I

Effects on Baking Quality of Fortifying Wheat Flour with Indicated Percentages of Defatted Soy Flour or Full-Fat Soy Flour

| Fortificant % | SSL % | Ave. Specific Loaf Volume CC/g | Grain Score |
|---|---|---|---|
| Defatted Soy Flour % | | | |
| 12 | 0 | 4.54 | 4 |
| 16 | 0 | 4.14 | 3 |
| 20 | 0 | 3.40 | 2 |
| 24 | 0 | 3.17 | 2 |
| 28 | 0 | 2.94 | 2 |
| 12 | 0.5 | 6.22 | 8 |
| 16 | 0.5 | 5.76 | 7 |
| 20 | 0.5 | 5.05 | 6 |
| 24 | 0.5 | 4.25 | 5 |
| 28 | 0.5 | 3.38 | 3 |
| Full-Fat Soy Flour % | | | |
| 12 | 0 | 4.90 | 4 |
| 16 | 0 | 4.58 | 4 |
| 20 | 0 | 4.24 | 3 |
| 24 | 0 | 3.82 | 2 |
| 28 | 0 | 3.22 | 2 |
| 12 | 0.5 | 6.62 | 9 |
| 16 | 0.5 | 6.34 | 8 |
| 20 | 0.5 | 6.24 | 8 |
| 24 | 0.5 | 6.03 | 7 |
| 28 | 0.5 | 5.82 | 7 |

The results in Table I indicate that SSL improves the baking performance of fortified flour in low shortening, low sugar breads. Its improving effect is greater for full-fat soy flour than for defatted soy flour, so more fullfat than defatted soy flour can be used to prepare acceptable high protein bread.

EXAMPLE II

Organoleptic tests were conducted to compare bread fortified with defatted soy flour containing 0.5 percent sodium stearoyl-2-lactylate against soy flour fortified bread which did not include the additive. The baking procedure used was as described in Example I.

In the first study, ten persons familiar with hedonic scale food preference testing representing a wide cross-section of the community to provide a range of consumer preference, were asked to rate appearance, flavor, texture, and overall acceptability of bread fortified with 12 percent defatted soy flour containing 0.5 percent SSL in one instance and without SSL in another instance. The samples were coded and the compositions or purpose of the test were not known by the panelists. The test panel was asked to score for appearance and palatability on a scale of:

| | |
|---|---|
| Highly desirable | 5 |
| Desirable | 4 |
| Acceptable | 3 |
| Fair | 2 |
| Unacceptable | 1 |

The test panel was asked to score for overall acceptability on a scale of:

| | |
|---|---|
| Would occasionally purchase and consume | 4 |
| Would purchase and consume but less frequently than 4 | 3 |
| Would consume product if it was available but would not purchase | 2 |
| Would neither purchase nor consume product | 1 |

The mean values obtained from this test panel scoring were as follows.

TABLE II

| | No SSL | 0.5% SSL |
|---|---|---|
| Appearance | 2.0 | 3.9 |
| Flavor | 2.8 | 3.0 |
| Texture | 2.1 | 3.6 |
| Overall Acceptability | 2.0 | 3.3 |

Subsequently, in another evaluation eight panelists (most of whom comprised the original panel) were asked to evaluate their preference between bread fortified with 16 percent defatted soy flour and containing no SSL versus 16 percent defatted soy flour fortified bread containing 0.5 percent SSL. The results of this test were scored on the same basis as previously described.

TABLE III

| | No SSL | 0.5% SSL |
|---|---|---|
| Appearance | 1.9 | 3.0 |
| Flavor | 2.5 | 2.9 |
| Texture | 1.5 | 2.8 |
| Overall Acceptability | 1.8 | 2.9 |

The results of these organoleptic evaluations reveal not only the beneficial effects of SSL on the texture and appearance of soy fortified low shortening, low sugar breads, but also indicate the improvement of taste or flavor when SSL is used in the formulations.

EXAMPLE III

High protein noodles (Chinese and Japanese noodles) of the wheat flour based, low shortening, low sugar variety were prepared containing 100 parts wheat flour, 12 or 18 parts defatted soy flour, 0.5 parts sodium stearoyl-2-lactylate, 2 parts salt and from 38 to 45 parts water. The noddle doughs were first admixed in a cake mixer or a single pin type mixer for 5 to 10 minutes at a speed of about 60 to 100 rpm or until cleanup. The dough was thereafter allowed to rest for 15 minutes and subsequently rolled with a hand roller several times until the dough reached the desired thickness. The dough was then cut to the desired size and shape for the production of oriental noodles.

The finished noodles were evaluated organoleptically for appearance, flavor, texture and acceptability. The taste panel consisted of 5 members, and the samples were first randomized, coded, and presented to the panel. The results of these tests are documented in the following Table IV.

TABLE IV

ORGANOLEPTIC DATA ON NOODLE CHARACTERISTICS ON OVERALL ACCEPTABILITY

| Noodle Sample | Appearance | Flavor | Texture | Overall Acceptability |
|---|---|---|---|---|
| Wheat Flour (control) | 3.30 | 3.23 | 3.53 | 3.36 |
| Soy-fortified flour (18%) | 3.28 | 3.18 | 3.48 | 3.50 |

Key for Scores

| | |
|---|---|
| Appearance: | 1 (badly split) to 4 (uniform, no deformed pieces. |
| Flavor: | 1 (off-flavor) to 4 (bland). |
| Texture: | 1 (tough or rubbery) to 4 (firm) |
| Acceptability: | 1 (highly unacceptable) to 5 (highly acceptable). |

The organoleptic and other data conclusively show that soy flour and sodium stearoyl-2-lactylate dramatically improves noodle texture, making it firm and less sticky after cooking, and moreover can actually increase the overall acceptability of Chinese and Japanese noodles.

Sodium stearoyl-2-lactylate (the most preferred additive) is generally prepared by admixing lactic acid in an aqueous medium with commercial grade stearic acid (an admixture of myristic, palmitic and stearic fatty acids) at a sufficiently elevated temperature to remain in a molten condition. In general, 1.0 equivalence of fatty acid is used for each 1.2 equivalents of lactic acid as monomer for each lactyl group desired. In this case therefore 2.4 equivalents of lactic acid are provided for each 1.0 equivalent of fatty acids. The mixture is stirred with heating whereupon about 1 equivalent of sodium hydroxide is added. The mixture is then heated to bring the temperature thereof up to about 200° C to complete the reaction. The reaction is carried out under an atmosphere of inert gas to remove water vapor and prevent oxidation of the stearic acid. A solid, slightly cream colored material is produced upon cooling of the reaction products and it is then ground into a fine powder for use. The powder is a mixture of sodium salts of a homologous series of stearoyl lactylic acids, in which the number of lactyl groups in the molecule is a function of the relative ratios of the constitutents brought into the admixture. As can be appreciated, in the broad forms of the present invention wherein the number of lactyl groups is defined as being from about 0.5 to 4, appropriate proportions of the original constitutents are employed in accordance with the above. Calcium stearoyl-2-lactylate is prepared in a similar manner except that calcium carbonate is used as the nutralization agent.

The respective reaction mixtures will contain unreacted lactic acids and lactylates, unreacted stearic acid, polylactylates and their salts. A specific procedure for producing sodium stearoyl-2-lactylate of which the numeral 2 indicates the average number of lactyl groups in the molecule, is set forth in detail in U.S. Pat. No. 2,789,992 insofar as stearoyl-2-lactylic acid ester is concerned and Pat. No. 2,733,252 which describes not only the preparation of sodium stearoyl-2-lactylate from stearic acid, sodium bicarbonate and lactylic acid, but also sets forth the parameters for production of the calcium lactylate composition. It is to be understood in this respect that although best results have been obtained by using sodium stearoyl-2-lactylate, and to a lesser degree, calcium stearoyl-2-lactylate, other equivalent lactylates may be employed in this invention including those stearoyl lactylates, and particularly sodium and calcium lactylates having a different average number of lactyl groups in the molecules as is the case with respect to the preferred lactylate additives specified herein. For example, as set forth in the broader forms of the invention, the average number of lactyl groups can be from about 0.5 to 4. Specifications for the preferred acyl lactylate sodium stearoyl-2-lactylate are set forth in Food Additive Regulation 21 CFR Section 121.1211.

Having thus described the invention what is claimed as new and desired to be secured by Letters Patent is:

1. A composition for preparing wheat flour based, low shortening, low sugar baked or fried products, comprising:

a quantity of wheat flour;

from 0 to 8 percent (baker's weight) of sugar;

from 0 to 6 percent (baker's weight) of shortening;

a quantity of protein supplement sufficient to provide at least about 2¼ percent by weight of additional protein to the baked or fried product and selected from the group consisting of soy flour, soy isolates, nonfat milk solids, whey products, fish protein concentrate, cottonseed flour, chick-pea flour, sesame seed flour, corn-soy-milk blend flour, wheat protein concentrate, wheat gluten, defatted wheat germ, Torula yeast, wheatsoy blend flour, edible single cell proteins, and mixtures thereof; and from about 0.1 to 3 percent (baker's weight) of an additive selected from the group consisting of the edible alkali and alkaline earth metal salts of the acyl lactylates of $C_{16}$–$C_{18}$ fatty acids, with the average number of lactylic group in said additive ranging from about 0.5 to 4.

2. The composition as set forth in claim 1 wherein said protein supplement is soy flour.

3. The composition as set forth in claim 1 wherein the admixture is devoid of sugar or shortening.

4. The composition as set forth in claim 1 wherein said additive is present in an amount of about 0.5 percent (baker's weight).

5. The composition as set forth in claim 1 wherein said additive is selected from the group consisting of the sodium and calcium salts of the acyl lactylates of $C_{16}$–$C_{18}$ fatty acids, with the average number of lactylic groups present therein being from about 0.5 to 4.

6. The composition as set forth in claim 5 wherein said additive is sodium stearoyl-2-lactylate.

7. The composition as set forth in claim 5 wherein said additive is calcium stearoyl-2-lactylate.

8. A method of supplementing the protein content of wheat flour based baked or fried products containing wheat flour and from about 0 to 8 percent (baker's weight) of sugar, and from acout 0 to 6 percent (baker's weight) of shortening, comprising:

incorporating into the ingredients of said products prior to baking or frying thereof a quantity of protein supplement sufficient to provide at least about 2¼ percent by weight of additional protein to said baked or fried products and selected from the group consisting of soy flour, soy isolates, nonfat milk solids, whey products, fish protein concentrate, cottonseed flour, chickpea flour, sesame seed flour, corn-soy-milk blend flour, wheat protein concentrate, wheat gluten, defatted wheat germ, Torula yeast, wheat-soy-blend flour, edible single cell proteins, and mixtures thereof; and incorporating into the ingredients of said products prior to baking or frying thereof from about 0.1 to 3 percent (baker's weight) of an additive selected from the group consisting of the edible alkali and alkaline earth metal salts of the acyl lactylates of $C_{16}$–$C_{18}$ fatty acids, with the average number of lactylic groups in said additive ranging from about 0.5 to 4.

9. The method of claim 8 wherein soy flour is added as said protein supplement.

10. The method of claim 8 wherein the amount of said additive is about 0.5 percent (baker's weight).

11. The method of claim 8 wherein said additive is selected from the group consisting of the sodium and calcium salts of the acyl lactylates of $C_{16}$–$C_{18}$ fatty acids, with the average number of lactylic groups therein being from about 0.5 to 4.

12. The method of claim 11 wherein sodium stearoyl-2-lactylate.

13. The method of claim 11 wherein calcium stearoyl-2-lactylate.

* * * * *